Aug. 25, 1964 W. S. FABER 3,146,002
TRAILER TONGUE SUPPORT
Filed Sept. 20, 1961
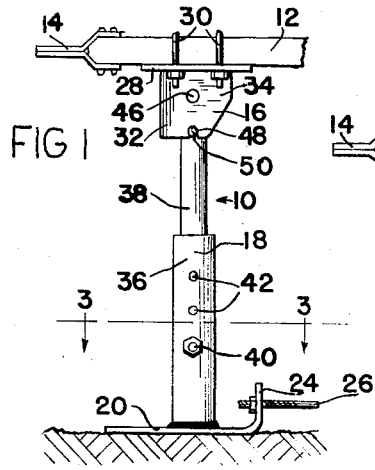
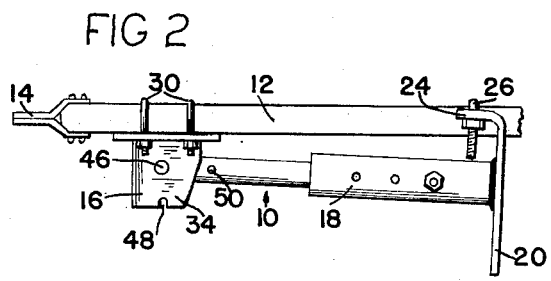
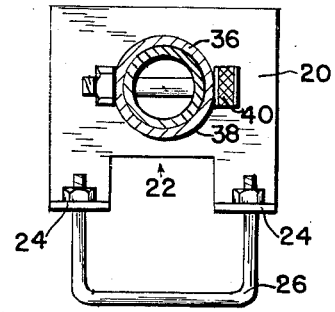
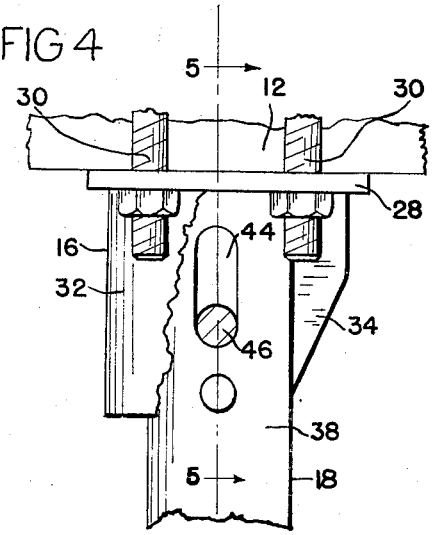
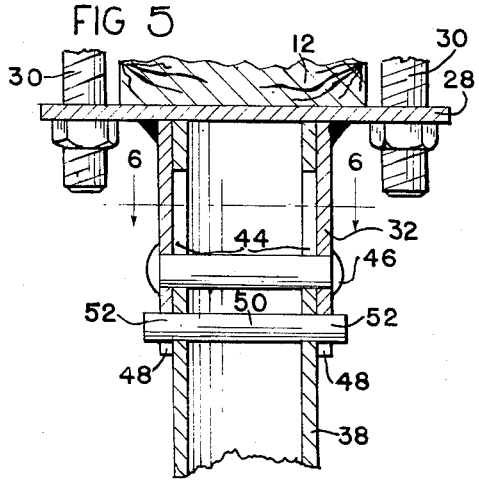
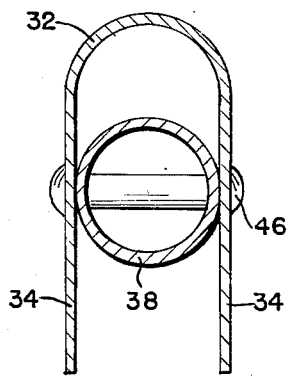
INVENTOR.
WALLACE S. FABER
BY Teller, McCormick, Paulding & Huber
ATTORNEYS United States Patent Office 3,146,002
Patented Aug. 25, 1964

3,146,002
TRAILER TONGUE SUPPORT
Wallace S. Faber, Thompsonville, Conn., assignor to Leather Limited Incorporated, Thompsonville, Conn., a corporation of Connecticut
Filed Sept. 20, 1961, Ser. No. 139,465
1 Claim. (Cl. 280—150.5)

This invention relates to a support for a trailer tongue, and deals more particularly with a tongue support which may be permanently or semi-permanently attached to the tongue so as to be readily available for use when the trailer is detached from its towing vehicle.

The object of this invention is to provide a support for the tongue of a trailer, such as a boat trailer, which support is readily and easily attached to the tongue and which when attached is movable between an active supporting position for holding the tongue in a raised position from the ground and a stowed or inactive position at which latter position the support does not interfere with the towing of the trailer.

A further object of this invention is to provide a trailer tongue support of the above character which is of a sturdy construction, is convenient to use, and yet is of a comparatively simple construction and relatively inexpensive to manufacture.

A further object of this invention is to provide in a trailer tongue support of the type having a head adapted for attachment to the tongue and a supporting leg, a novel construction for the head and a novel means for attaching the head to the leg whereby the leg may be easily swung from an active to an inactive position and is releasably held locked in the active position by the weight of the tailer tongue to prevent the support from collapsing.

A further object of this invention is to provide a trailer tongue support which is adjustable to vary the height at which the tongue is held from the ground.

A still further object of this invention is to provide a trailer tongue support of the foregoing character including a novel base construction which cooperates with the trailer tongue to hold the support in its inactive or stowed position.

Other objects and advantages of the invention will be apparent from the following description and from the drawing forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claim forming a part of this specification being relied upon for that purpose.

Of the drawing:

FIG. 1 is a side elevational view of a trailer support embodying the present invention with the support being shown attached to a trailer tongue and with the leg of the support being shown in its active supporting position.

FIG. 2 is a view similar to FIG. 1 but with the leg of the support being shown moved to its inactive position.

FIG. 3 is a transverse sectional view taken on the line 3—3 of FIG. 1.

FIG. 4 is an enlarged fragmentary view showing the head of the trailer support of FIG. 1 and in which view part of the head is broken away to reveal the slot in the upper end of the leg.

FIG. 5 is a longitudinal sectional view taken on the line 5—5 of FIG. 4.

FIG. 6 is a transverse sectional view taken on the line 6—6 of FIG. 5.

Turning now to the drawing, and first particularly referring to FIGS. 1 and 2, the reference numeral 10 indicates in general a trailer support embodying the present invention. The trailer support 10 is adapted for attachment to the front end of an elongated trailer tongue 12. The tongue 12 is of the usual type employed in trailers, such as boat trailers, and may be made of either wood or metal. At the forward end of the tongue the latter is provided with a suitable hitch 14 adapted for connection to a towing vehicle, and the trailer support 10 is preferably attached to the tongue 12 immediately to the rear of the hitch 14. In the present instance, the tongue 12 is assumed to be wooden and the trailer support 10 is attached thereto by means of U-bolts as hereinafter described. Other means of attaching the support to the tongue may, however, be employed, and in the case where the tongue is made of metal the support may, if desired, be permanently attached thereto by means of welding.

In accordance with the invention, the support 10 comprises basically a head 16 adapted for attachment to the tongue 12 and a supporting leg 18. The leg 18 is connected with the head 16 and is movable between a first or active position, such as shown in FIG. 1, at which the leg extends generally downwardly from the tongue 12 to support the latter in a raised position from the ground and a second or inactive position, such as shown at FIG. 2, at which the leg is removed from its downwardly extending position and is disposed in such relation to the tongue 12 as to not interfere with the towing of the trailer after the hitch 14 is connected to the towing vehicle. The means connecting the leg 18 with the head 16 are such as to permit the leg to be pivotally swung from said active to said inactive position and are further such as to permit the leg to be moved along its longitudinal axis relative to the head when the leg is in its active position.

Combined with the means connecting the leg to the head are other means which utilize the weight of the trailer tongue to releasably hold the leg in its first or active position relative to the head member. This means comprises a notch formed in either the leg or the head and a locking finger provided on the other member which fits into the notch to prevent pivotal movement of the leg when the leg actively supports the tongue. When, however, the tongue is raised the head moves longitudinally or upwardly relative to the leg and removes the finger from the notch to free the leg for pivotal movement to its inactive position.

The leg 18 also includes a base 20 which is attached to its free end by welding. The base 20 has a substantially flat surface which engages the ground and is of a sufficient surface area to support the trailer tongue on relatively soft ground without sinking. The connection between the head 16 and the leg 18 is further such that when the leg is moved to its inoperative position the leg is positioned substantially parallel and in closely spaced relationship to the tongue 12. In order to allow the leg 18 to be moved as close to the tongue 12 as possible, the base 20 is preferably provided with a notch 22 along its rear edge which notch serves to receive at least a portion of the trailer tongue 12 as shown in FIG. 2. Various different means may be employed for holding the leg in its inactive position, but preferably, the base 20 includes two apertured flanges 24, 24 located respectively on either side of the notch 22. The flanges 24, 24 in turn serve to receive a U-bolt 26 which passes over the tongue 12 and through the two apertured base flanges 24, 24 to securely hold the leg 18 in its inoperative position.

An exemplary form of the head 16, leg 18 and the connecting and locking means between the head and leg is shown in the drawing. In the illustrated case, the head 16 includes a flat cap member 28 adapted to engage the undersurface of the tongue 12 as shown in FIGS. 1, 2, 4 and 5. The member 28 is of such a size as to extend laterally outwardly for some distance from either side of the tongue 12 and the outwardly extending portions thereof are provided with openings for receiving two U-bolts 30, 30 which serve to hold the head to the tongue in the manner shown in FIGS. 1 and 2. It will be understood, however, that means other than the U-bolts 30, 30 may be used to attach the head 16 to the tongue 12, and in the case where the tongue 12 is made of metal it is contemplated that the cam member 28 may be welded directly to the tongue, if desired.

Welded to the undersurface of the cam member 28 is a U-shaped housing 32 which provides two laterally spaced side walls 34, 34. The housing is open at its bottom and the open side of the U faces rearwardly toward the trailer. The leg 18 comprises two separate members 36 and 38, both of which are tubular, and the upper member 38 is partially telescoped into the lower member 36. The two members are held in axially fixed relationship to one another by a bolt 40 which passes through an opening in the lower end of the member 38 and one of several openings 42, 42 in in the member 36. By placing the bolt 40 in different ones of the openings 42 the height which the support holds the trailer tongue above the ground may be varied.

The upper end of the member 38 is received between the side walls 34, 34 of the housing 32, and as shown best in FIG. 4 this upper end is provided with a longitudinally extending slot 44 which passes transversely through the member 38. Actually, since the member 38 is tubular the slot 44 comprises two separate transversely aligned slots but will be referred to herein and in the claim as a single slot. Carried by and fixed to the housing 32 is a transverse pin 46 which extends between the side walls 34, 34 and passes through the elongated slot 44 in the member 38. The pin 46 and slot 44 therefor serve to pivotally connect the leg 18 to the head 16 and at the same time allow the leg to move to a limited extent longitudinally relative to the head. As shown in FIGS. 5 and 6, the pin 46 is provided with a head at both ends so as to be axially fixed to the side walls to prevent the same from spreading apart. Preferably, but not necessarily, the relative sizes of the parts are such that when the leg 18 is in its active supporting position, the upper end surface of the member 38 will engage the undersurface of the cap member 28 before the pin 46 bottoms against the lower end of the slot 44. The load imposed on the support by the tongue 12 will therefore be transferred directly from the cap 28 to the leg 38 without any load being imposed on the pin 46 or on the locking pin hereinafter described.

The locking means for releasably holding the leg 18 in its active position comprises two notches 48, 48 formed respectively in the lower edges of each of the housing walls 34, 34. One of the notches 48 is shown in FIGS. 1 and 2, and it is to be understood that the other housing wall 34 hidden from the view in these figures is also provided with a similar notch which is transversely aligned with that shown. Carried by the leg member 38 is a transverse locking pin 50 which is press-fitted into openings in the latter member so as to be securely held in place. The pin 50 is of such a length as to extend laterally outwardly from either side of the member 38 and the laterally outwardly extending portions thereof define locking fingers 52, 52 which cooperate respectively with the notches 48, 48.

The location of the locking pin 50 is such that when the leg 18 is in the active supporting position in FIG. 1, the finger portions of the pin 50 will be located respectively within the notches 48, 48 so as to prevent pivotal movement of the leg 18 about the axis of the pin 46. It will be understood, of course, that at this time the weight of the trailer tongue 12 presses the head 16 downwardly so that the pivot pin 46 is located adjacent the bottom of the slot 44. It will be further understood that when the tongue 12 is raised slightly the head 16 will move upwardly relative to the leg 18, with the pivot pin 46 likewise moving upwardly in the slot 44, and this will move the slots 48, 48 out of locking relaitonship with the locking fingers 52, 52. The leg 18 may thereafter be removed to the position shown in FIG. 2 and the U-bolt 26 used to secure the leg in the position shown. The weight of the tongue, therefore, acts to normally hold the support in a locked position and when the trailer tongue is raised, as to connect the tongue to the towing vehicle, the support is released for movement to its inactive position.

It will, of course, be further understood that by proper location of the height adjusting bolt 40 the trailer support 10 may be made to support the tongue 12 at a position very close to that required for hitching to the towing vehicle and that, therefore, the support overcomes the great amount of manual lifting which is often present in other trailer supports.

The invention claimed is:

A support for a trailer tongue, said support comprising a head adapted for attachment to a tongue such as aforesaid and which head includes two laterally spaced and downwardly extending wall portions, an elongated supporting leg having one end positioned between said two wall portions of said head and having a longitudinally extending slot passing transversely through said one end, a first transverse pin extending between said laterally spaced walls and axially fixed thereto to prevent said walls from spreading apart and passing through said slot in said leg so as to connect said leg to said head and to permit said leg to be moved pivotally relative to said head between a first position at which said leg extends generally downwardly from said tongue to support the latter in a raised position from the ground and a second position different from said first position, said pin and slot further permitting said leg to be moved along its longitudinal axis relative to said head when said leg is in said first position, means defining a downwardly opening notch in the lower end of each of said wall portions and each of which notches is transversely aligned with the other, a second transverse pin carried by and passing through said leg which pin extends outwardly beyond each side of said leg, said pin being so located that the outwardly extending portions thereof fit respectively into said notches in said wall portions to prevent pivotal movement of said leg when the latter actively supports said tongue and so that said outwardly extending portions are removed from said notches by longitudinal movement of said leg relative to said head when said tongue is raised, said leg being of such a shape that the upper end thereof bears against said head to directly transfer at least a part of the weight of said tongue to said leg when the latter is in said first position, a base attached to the free end of said leg and having a notch in one edge thereof for receiving at least a portion of said tongue when said leg is in said second position, said base further including an apertured flange on either side of the notch therein, and a U-bolt adapted to pass over said tongue and through said two apertured base flanges to hold said leg in said second position.

References Cited in the file of this patent
UNITED STATES PATENTS

| | | |
|---|---|---|
| 2,634,941 | Eckert | Apr. 14, 1953 |
| 2,850,292 | Holland | Sept. 2, 1958 |
| 2,865,658 | Dubuque | Dec. 23, 1958 |
| 2,965,392 | Mitchell et al. | Dec. 20, 1960 |
| 2,984,499 | Humphrey | May 16, 1961 |

UNITED STATES PATENT OFFICE
CERTIFICATE OF CORRECTION

Patent No. 3,146,002                                      August 25, 1964

Wallace S. Faber

It is hereby certified that error appears in the above numbered patent requiring correction and that the said Letters Patent should read as corrected below.

Column 3, lines 8 and 10, for "cam", each occurrence, read -- cap --.

Signed and sealed this 22nd day of December 1964.

SEAL)
Attest:

ERNEST W. SWIDER                                         EDWARD J. BRENNER
Attesting Officer                                             Commissioner of Patents